United States Patent
Lauzon et al.

(10) Patent No.: US 6,424,762 B1
(45) Date of Patent: Jul. 23, 2002

(54) SUPERFLUORESCENT FIBER SOURCE

(75) Inventors: Jocelyn Lauzon, Saint-Augustin-de-Desmaures; Michel Bégin, Québec, both of (CA)

(73) Assignee: Institut National D'Optique, Quebec (CA)

( * ) Notice: Subject to any disclaimer, the term of this patent is extended or adjusted under 35 U.S.C. 154(b) by 0 days.

(21) Appl. No.: 09/519,272

(22) Filed: Mar. 7, 2000

(51) Int. Cl.[7] .............................................. G02B 6/26
(52) U.S. Cl. ........................... 385/27; 385/31; 385/15; 372/6; 359/333
(58) Field of Search ........................... 385/15, 27, 31, 385/123; 372/6, 69; 359/333, 337.21

(56) References Cited

U.S. PATENT DOCUMENTS

| | | | |
|---|---|---|---|
| 3,808,510 A | 4/1974 | Dubrovin et al. | 321/5 |
| 4,367,025 A | 1/1983 | Metzger | 354/145 |
| 4,938,556 A | 7/1990 | Digonnet et al. | 350/96.15 |
| 5,189,676 A * | 2/1993 | Wysocki et al. | 372/6 |
| 5,268,910 A | 12/1993 | Huber | 372/6 |
| 5,311,603 A * | 5/1994 | Fidric | 385/11 |
| 5,319,652 A | 6/1994 | Moeller et al. | 312/6 |
| 5,875,203 A * | 2/1999 | Wagener et al. | 372/6 |
| 6,091,743 A * | 7/2000 | Yang | 372/6 |
| 6,144,788 A * | 11/2000 | Ang et al. | 385/31 |

* cited by examiner

Primary Examiner—Rodney Bovernick
Assistant Examiner—Sung Pak
(74) Attorney, Agent, or Firm—Merchant & Gould P.C.

(57) ABSTRACT

A low-cost superfluorescent fiber souce. A gain medium in a length of optical fiber is pumped in counter-propagation by a pump source, producing superfluorescent radiation. The pump source is coupled to the fiber by a first coupler, disposed forward of the gain medium, that selectively transmits the pump signal in the backward direction, and the superfluorescence in the forward direction. A second coupler is disposed backward of the gain medium, selectively transmitting the backward propagating superfluorescent radiation along a first path and the pump signal along a second path, the pump signal is absorbed in the second path by a high-attenuation fiber, to avoid feedback to the pump laser, and the superfuorescent is reflected in the first path back toward the source output. Advantageously, this source can be realized with readily available optical components that are easy to assemble and do not require any alignment.

14 Claims, 1 Drawing Sheet

SUPERFLUORESCENT FIBER SOURCE

FIELD OF THE INVENTION

The present invention relates to the field of optical fiber power roadband light sources, and more particularly concerns a superfluorescent ptical fiber source.

BACKGROUND OF THE INVENTION

Superfluorescent fiber sources are in large demand to make optical sensors (gyroscopes) or for the characterization of DWDM (Dense Wavelength Division Multiplexing) optical communication components such as fiber Bragg gratings and wavelength multiplexers/demultiplexers. Advantageously, the use of a broadband superfluorescent fiber source as a probe signal in characterizing such systems makes it possible to probe the whole communication transmission band at once, thereby allowing to characterize multiple channels simultaneously. For rare-earth-doped fiber amplifiers, the communication transmission band is defined most of the time by the gain spectrum of the gain medium used, and a superfluorescent fiber source made of the same rare-earth doped fiber will allow to cover the needed wavelength band. One of the requirements for a superfluorescent fiber source used in such an application is that it should be very stable, especially if one wants to have precise characterization parameters, such as insertion loss for example. These sources should also have sufficient power to have a good signal to noise ratio at the detector level.

The main challenge associated with making a superfluorescent light source is to be able to recuperate both the forward and backward propagating ASE (Amplified Spontaneous Emission) signal without creating harmful feedback into the pump laser. Thus, a pump/ASE signals reflection discriminator must be implemented. The initial ASE source configurations that were disclosed, such as in U.S. Pat. No. 3,808,549 (MAURER) and U.S. Pat. No. 4,637,025 (SNITZER et al), were very straightforward and did not take into account the recuperation of the ASE signal of opposite direction to the output. In the first configurations to be presented, the pump feedback was not even considered; these fluorescent light sources thus had very unstable output powers. The idea of eliminating feedback by using a filter within the fiber source configuration was only introduced later, but most of the time this function was not combined with the recuperation of the ASE signal of opposite direction to the output, as for example in the device disclosed in U.S. Pat. No. 5,319,652 (MOELLER et al). As well, U.S. Pat. No. 4,938,556 (DIGONNET et al) discloses two configurations that involve a pump/ASE signals reflection discriminator, but both configurations necessitate high cost dichroic (wavelength selective) filters.

There is therefore a need for a superfluorescent source provided with discriminating means to recuperate backward propagating ASE radiation that is low cost, and uses only readily available optical components that are easy to assemble and do not require any alignment.

SUMMARY OF THE INVENTION

The present invention therefore provides a superfluorescent fiber source. The superfluorescent source first includes an optical pump source for generating pump radiation, and a length of optical fiber having forward and backward directions. A region in the length of optical fiber defines a gain medium.

A first optical coupler is provided, for coupling the optical pump source to the length of optical fiber, at a point forward of the gain medium. The pump radiation thereby propagates in the backward direction in the gain medium, and is partly absorbed thereby to stimulate the emission of both forward and backward propagating superfluorescent radiation. Residual pump radiation propagates in the backward direction. The first optical coupler selectively transmits the pump radiation in the backward direction, and the superfluorescent radiation in the forward direction.

Also provided is a second optical coupler, for coupling the residual pump radiation out of the length of optical fiber. The second optical coupler is disposed in the length of optical fiber backward of the gain medium, and it selectively transmits the backward propagating superfluorescent radiation along a first path and the residual pump radiation along a second path.

The superfluorescent fiber source also includes reflecting means disposed in the first path, for reflecting the backward propagating superfluorescent radiation in the forward direction.

Finally, absorbing means are provided, disposed in the second path, for absorbing the residual pump radiation.

Advantageously, the present invention provides a simple, reliable superfluorescent fiber source configuration enabling optimal and stable output power. This configuration necessitates only low-cost, readily available optical components which are easy to assemble and do not require any alignment.

The present invention and its advantages will be better understood upon reading the following non-restrictive description of preferred embodiments thereof, made with reference to the accompanying drawings.

DESCRIPTION OF PREFERRED EMBODIMENTS OF THE INVENTION

Figure 1:
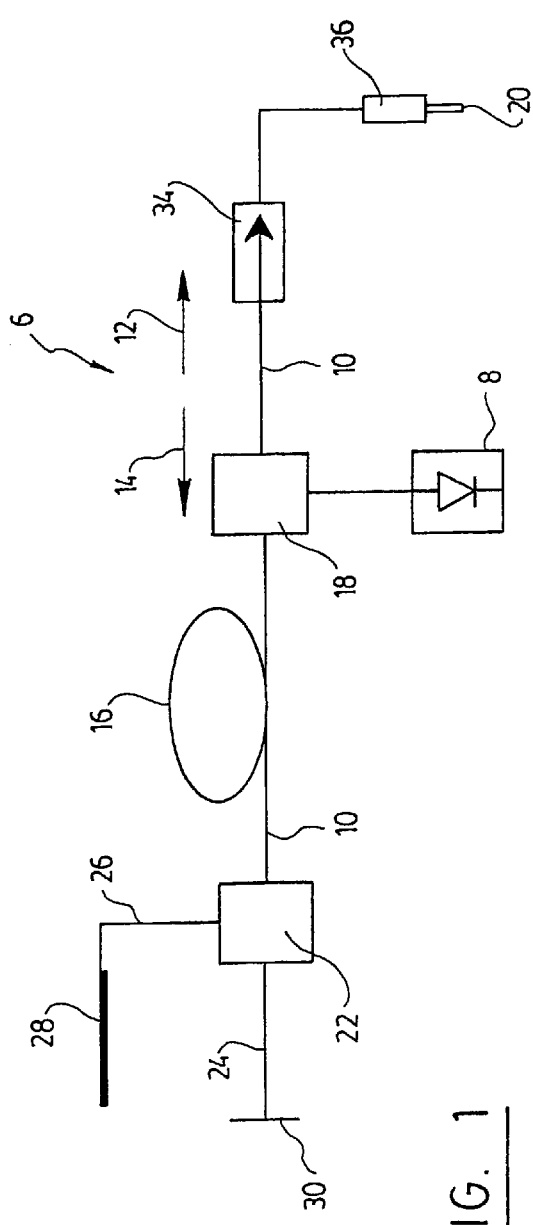
FIG. 1 is a schematic representation of a superfluorescent fiber source according to a first embodiment of the invention.
Figure 2:
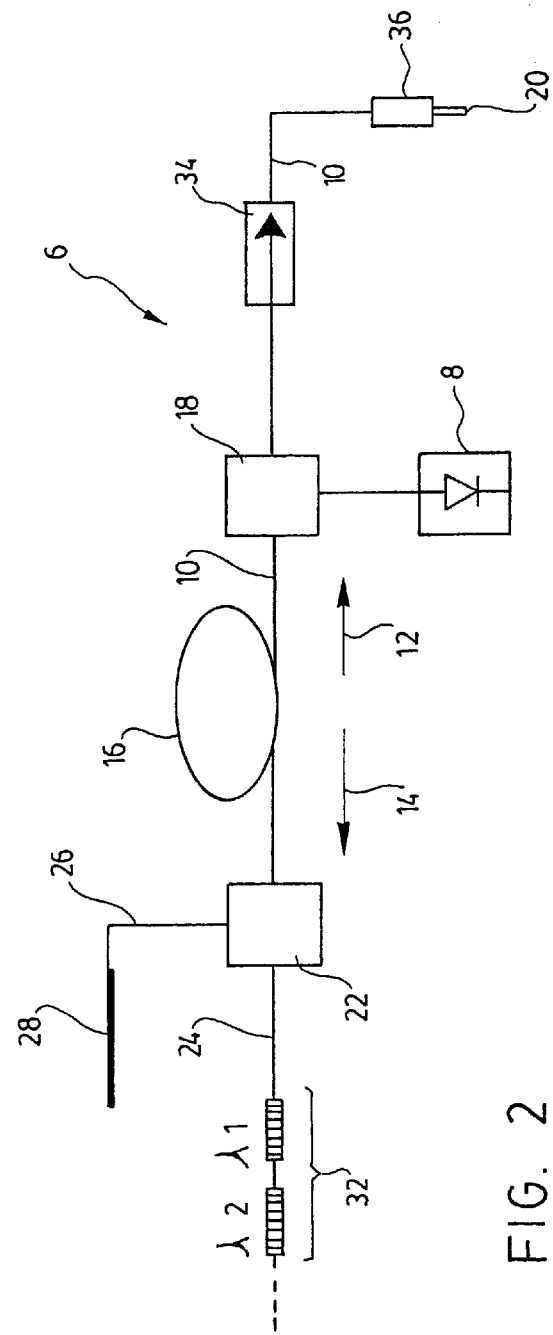
FIG. 2 is a schematic representation of a superfluorescent fiber source according to a second embodiment of the invention.

With reference to FIGS. 1 and 2, a superfluorescent fiber source 6 is shown according to preferred embodiments of the invention.

The fiber source 6 first includes a pump source 8 for generating pump radiation, preferably a 980 nm laser diode with a fiber output of approximately 100 mW (such pump lasers are sold commercially by SDL Inc., Lasertron, Inc. and many others). The pump radiation is pigtailed to a length of optical fiber 10. In the preferred embodiment, a single-mode fiber is used. The two propagation directions in the length of optical fiber 10 will be referred to as the forward direction 12 and the backward direction 14.

A region of the length of optical fiber 10 defines a gain medium 16. When a pump signal is launched into such a gain medium 16, part of it is absorbed to stimulate the emission of Amplified Spontaneous Emission (ASE) by the gain medium. This ASE is a broadband optical signal also known as fluorescence. When this ASE signal has high output power>1 mW), it is sometimes called superfluorescence. The ASE signal is emitted in all directions with no distinctions. Some of this ASE signal, emitted in distributed directions, is captured and guided along the single-mode fiber in both forward and backward directions. In the preferred embodiment, the gain medium 16 is an erbium-doped fiber (such fibers are sold commercially by INO, Lucent Technologies and many others). However, this configuration works with any rare-earth doped fiber, depending on the wavelength band output needed. Residual pump radiation will propagate in the backward direction.

A first coupler 18 is provided, for coupling the optical pump source 8 to the length of optical fiber 10. The first coupler 18 ideally should be able to selectively transmit the pump radiation in the backward direction 14 in the optical fiber 10 and the superfluorescent radiation in forward direction 12. The first coupler 18 is disposed forward of the gain medium 16. In this manner, the gain medium 16 is pumped in the counter-propagation, and only the ASE signal is transmitted to the output 20 of the source. In the preferred embodiment, standard 980/1550 WDM couplers are used to make the discrimination between the pump ASE signal (such couplers are sold commercially by MP Fiberoptics Inc., Simicem Ltd. and many others).

In order to recuperate both the backward and forward emissions at the fiber source output 20, a mirror has to be used at the opposite end of the source output 20. This reflector should preferably reflect only the ASE signal, so as to avoid feedback of the pump signal and cause unstable power output behaviours of the source. For this purpose, a second coupler 22 is provided for coupling the pump radiation out of the length of optical fiber 10. The second coupler 22 is disposed in the optical fiber 10 backward of the gain medium 16, and selectively transmits the backward propagating superfluorescence along a first path 24, and the pump radiation along a second path 26. A second 980/1550 WDM coupler is preferably used to embody the second coupler 22. The first path 24 is preferably the continuation of the length of optical fiber 10, and a reflector is disposed therein for reflecting the backward propagating superfluorescent radiation in the forward direction 12. The second path 26 is preferably a high attenuation fiber 28, to absorb the residual pump radiation and avoid feedback to the pump laser. Any other type of absorbing means may alternatively be used. For a 980 nm pump signal, a cobalt-doped or a Yb-doped single-mode optical fiber is suggested as the high-attenuation fiber (such fibers are sold commercially by INO, Fibercore Ltd. and many others).

The reflector may be embodied by any appropriate broadband mirror 30, as shown in FIG. 1. The mirror 30 can be any bulk mirror to which the fiber 10 is butt-coupled. In the preferred embodiment, a thin-film high-reflection coating, such as gold, is deposited on the fiber end (such fiber pigtails with gold-coated fiber ends are sold commercially by INO, Seikoh Giken and many others). Alternatively, a Bragg grating 32 photo-induced in the first path 24 may be used. FIG. 2 shows an example of such an embodiment where a grating reflecting a plurality of wavelengths is used, but of course, any appropriate type of Bragg grating may be used. This embodiment has the advantage of allowing a wavelength tailoring of the output signal.

An optical isolator 34 is preferably installed right before the source output 20 to keep this output stable by avoiding ASE signal feedback that could cause lasing effects (such isolators are sold commercially by MP Fiber Optics Inc., E-Tek Dynamics, Inc., and many others). Finally, the output of the superfluorescent light source can be simply a singlemode fiber pigtail with or without an optical connector 36.

Using the configuration suggested above and illustrated in FIG. 1, a total output power from the superfluorescent fiber source 6 of 15.3 dBm (about 34 mW) has been experimentally obtained, using a 100 mW pump signal. If the reflection discriminator was not installed on the superfluorescent light source, the output power dropped to 13.4 dBm (about 22 mW). The output stability was better than 0.1 dB over 60 minutes using this novel configuration.

Advantageously, the fiber source configuration according to the present invention optimizes the power output while maintaining this optical power output very stable in time. The proposed superfluorescent light source configuration also has the advantages of using low-cost components which are easy to assemble and do not require any alignment.

Of course, numerous changes could be made to the preferred embodiment disclosed hereinabove without departing from the scope of the invention as defined in the appended claims.

What is claimed is:

1. A superfluorescent fiber source comprising:

an optical pump source for generating pump radiation;

a length of optical fiber having forward and backward directions, a region therein defining a gain medium;

a first optical coupler for coupling the optical pump source to the length of optical fiber forward of the gain medium, the pump radiation thereby propagating in the backward direction in the gain medium and being partly absorbed thereby to stimulate the emission of both forward and backward propagating superfluorescent radiation, residual pump radiation propagating in the backward direction, the first optical coupler selectively transmitting the pump radiation in the backward direction and the superfluorescent radiation in the forward direction;

a second optical coupler for coupling the residual pump radiation out of the length of optical fiber, the second optical coupler being disposed in said length of optical fiber backward of the gain medium and selectively transmitting the backward propagating superfluorescent radiation along a first path and the residual pump radiation along a second path;

reflecting means disposed in the first path for reflecting the backward propagating superfluorescent radiation in the forward direction; and absorbing means disposed in the second path for absorbing the residual pump radiation.

2. A superfluorescent fiber source according to claim 1, wherein the optical pump source is a laser diode.

3. A superfluorescent fiber source according to claim 2, wherein the laser diode has a wavelength of about 980 nm.

4. A superfluorescent fiber source according to claim 1, wherein the length of optical fiber is a single-mode optical fiber.

5. A superfluorescent fiber source according to claim 4, wherein the gain medium is a rare-earth doped portion of the length of optical fiber.

6. A superfluorescent fiber source according to claim 1, wherein the reflecting means comprise a mirror.

7. A superfluorescent fiber source according to claim 6, wherein the mirror is a thin-film high reflection coating deposited on a backward extremity of the first path.

8. A superfluorescent fiber source according to claim 6, wherein the mirror is a bulk mirror coupled to a backward extremity of the first path.

9. A superfluorescent fiber source according to claim 1, wherein the gain medium is an erbium-doped portion of the length of optical fiber.

10. A superfluorescent fiber source according to claim 1, wherein the first and second optical couplers are WDM fiber couplers.

11. A superfluorescent fiber source according to claim 1, wherein the first fiber path is a portion of the length of optical fiber.

12. A superfluorescent fiber source according to claim 1, wherein the absorbing means comprise a high attenuation optical fiber defining the second path.

13. A superfluorescent fiber source according to claim 1, wherein the reflecting means comprise a Bragg grating.

14. A superfluorescent fiber source according to claim 1, further comprising an isolator disposed in the length of optical fiber forward of the first coupler.

* * * * *